United States Patent [19]

Robusto et al.

[11] Patent Number: 5,572,652
[45] Date of Patent: Nov. 5, 1996

[54] SYSTEM AND METHOD FOR MONITORING AND CONTROLLING ONE OR MORE COMPUTER SITES

[75] Inventors: John D. Robusto, Herndon, Va.; William H. Boswell, State College, Pa.; Mary E. Meckley, Las Vegas, Nev.; Deanna R. Niechwiadowicz, State College, Pa.; David J. Watt, Freeport, Pa.; Gorman N. Findley, Boalsburg, Pa.; Gretchen M. Lenze, State College, Pa.

[73] Assignee: The United States of America as represented by the Secretary of the Navy, Washington, D.C.

[21] Appl. No.: 223,406

[22] Filed: Apr. 4, 1994

[51] Int. Cl.$^6$ ............................................. G06F 15/00
[52] U.S. Cl. ............................................. 395/326; 395/352
[58] Field of Search ............................... 395/153–161, 395/575, 200, 600

[56] References Cited

U.S. PATENT DOCUMENTS

| | | | |
|---|---|---|---|
| 4,672,572 | 6/1987 | Alsberg | 380/23 |
| 4,805,134 | 2/1989 | Calo et al. | 395/600 |
| 5,007,017 | 4/1991 | Kabayashi | 364/900 |
| 5,123,089 | 1/1992 | Bolinski et al. | 395/200 |
| 5,126,932 | 6/1992 | Wolfson et al. | 364/131 |
| 5,141,622 | 8/1992 | Owens | 395/200 |
| 5,142,683 | 8/1992 | Burkhardt, Jr. et al. | 395/725 |
| 5,159,685 | 10/1992 | Kung | 395/575 |
| 5,226,120 | 7/1993 | Brown et al. | 395/200 |
| 5,261,044 | 11/1993 | Dev et al. | 395/159 |
| 5,295,244 | 3/1994 | Dev et al. | 395/161 |
| 5,377,196 | 12/1994 | Godlew et al. | 395/917 |

OTHER PUBLICATIONS

Feridun et al., "ANM:Automated Network Management System," *IEEE Network*, Mar. 1988, vol. 2 No. 2 pp. 13–19.
Rabie et al., "DAD:A Real–Time Expert System for Monitoring of Data Packet Networks", *IEEE Network*, Sep. 1988, vol. 12 No. 5 pp. 29–34.

*Primary Examiner*—Raymond J. Bayerl
*Assistant Examiner*—U. Chauhan
*Attorney, Agent, or Firm*—Elmer E. Goshorn

[57] ABSTRACT

An improved user computer interface visual display workstation (UCIVDWS) system and an improved method for carrying out the system that concerns a common, password controlled UCIVDWS of the system for selectively controlling and monitoring one or more computer site arrangements; with each computer site being controllable in multi-mission fashion whether any computer site arrangement is arranged locally to or remote from the workstation arrangement; and even if any computer site arrangement has a different operating system from either any other system computer site arrangement or the system workstation itself. Moreover, the visual display at the workstation is generally made up of a multi-section, multi-formatted configuration such that certain sections of the workstation display have a plurality of user selectable function button. Other sections of the workstation display provide a variety of menus with or without submenus thereof in response to user selection of certain function button at various sections thereof. Because of the UCIVDWS being a common workstation for any computer site arrangement and by reason of a predetermined security access level for authorized password user, management concerns are significantly minimized since any authorized user can only use the common system workstation (within his/her access level) for the purpose of carrying out management demands relative to anyone's access level for the purpose of enhanced monitoring and control of any computer site arrangement throughout system use. The improved method by reason of unique selecting steps as effected by any acceptable system, because of an enhanced software architecture design for the system, advantageously carries out system multi-mission monitoring and control in a manner not heretofore contemplated.

11 Claims, 15 Drawing Sheets

PASSWORD

ENTER YOUR USER ID

ENTER YOUR OLD PASSWORD

ENTER NEW PASSWORD

VERIFY NEW PASSWORD

OK    CANCEL

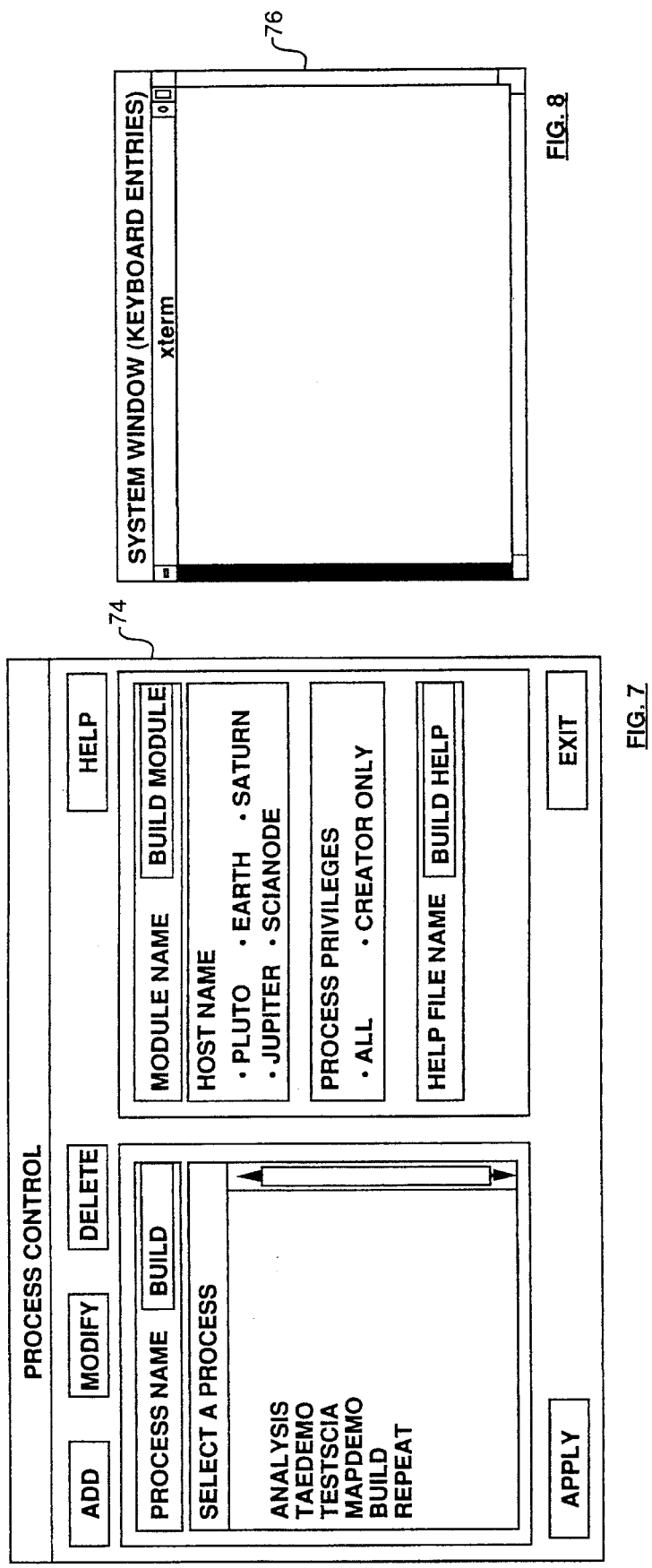

USER CAPABILITIES LIST

DEFAULT: has access to all of the following processes noted with an "x"

☐ (SYSTEM WINDOW)
☐ (PROCESS CONTROL)
☐ (USER CAPABILITIES)
☒ ICSC
☒ PROCESSING
☒ EXIT
☒ NETOPS
☒ COLLECT
☐ REPORTING
☐ ANALYSIS
☒ TRAEDEMO
☒ TEST SCIA
☒ MAPDEMO
☒ ESMAIN
☒ EXPERT

USER CAPABILITIES

[ ADD ]  [ MODIFY ]  [ DELETE ]  [ LIST ]  [ HELP ]

USER ID [    ]

• ALL • DEFAULT • NON PRIVILEGED

PRESS ESCAPE BUTTON (ESC) AFTER SELECTION

SELECT NON USER
SYSTEM Mgr
DEFAULT Mgr

AVAILABLE PROCESSES / OPERATIONS (SYSTEM WINDOW)
(PROCESS CONTROL)
(USER CAPABILITIES)
ICSC
PROCESSING
EXIT
NETOPS
COLLECT
REPORTING
ANALYSIS
TRAEDEMO
TEST SCIA
MAPDEMO
ESMAIN
EXPERT

PASSWORD [    ]

[ APPLY ]  [ EXIT ]

FIG. 9

ANY AUTHORIZED USER MAY SELECT "PRIVILEGED" DESIGNATED BUTTON OF THE MBRD OF THE SECOND PS; WITH SUCH SELECTION DISPLAYING A PRIVILEGED FUNCTIONS MENU IN THE THIRD PS; THEN THE USER MAY SELECT ONE OF THE THREE PRIVILEGED FUNCTIONS LISTED IN THE MENU, NAMELY: USER CAPABILITIES, PROCESS CONTROL OR SYSTEM WINDOW. <u>IF USER CAPABILITIES IS SELECTED,</u> THEN ITS SUBMENU IS DISPLAYED IN THE THIRD PS FOR SPECIFYING ADD, MODIFY, DELETE OR LIST RELATIVE TO BOTH SYSTEM USER(S) / NON-USER(S) AND SYSTEM MONITORED CS MEANS PROCESSES AND / OR OPERATIONS CAN BE LISTED BY A LOWER TIER SUBMENU FOR DESIGNATING WHICH PROCESSES AND / OR OPERATIONS ARE AUTHORIZED OR NON-AUTHORIZED RELATIVE TO ANY SYSTEM USER ALL FOR THE PURPOSE OF CARRYING OUT MANAGEMENT DEMANDS. <u>IF PROCESS CONTROL IS SELECTED,</u> THEN ITS SUBMENU IS DISPLAYED IN THE THIRD PS FOR DISPLAYING A LIST OF ADDITIONAL PROCESSES FOR ANY CS MEANS OF THE FIRST PS; WHERE ANY PROCESS OF THIS LIST COULD BE SELECTED FOR CHANGING THE DESIGNATED PROCESS OF ANY FB OF THE PLURALITY OF FUNCTION BUTTONS OF THE FOURTH PS WITH THIS FOURTH PS BEING FOR ADDITIONAL PROCESSES RELATIVE TO ANY USER-SELECTED FB MEANS OF ANY GIVEN CS MEANS OF THE FIRST PS DURING SYSTEM USE; AND WHERE THE SUBMENU PROCESSES LIST CAN BE ADDED TO, MODIFIED OR DELETED AS REQUIRED. THIS SUBMENU ALSO DISPLAYS HOST NAME SELCTION FOR ANY CS MEANS AS WELL AS WHAT USERS ARE AUTHORIZED FOR ACCESS TO THIS PRIVILEGED FUNCTION. <u>IF SYSTEM WINDOW IS SELECTED,</u> THEN ITS SUBMENU IS DISPLAYED IN THE THIRD PS FOR ENABLING ANY AUTHORIZED USER TO ADD, DELETE OR MODIFY ANY KEYBOARD ENTRY TO THE UCIVDWS MEANS FOR THE PURPOSE OF ASSISTING ANY AUTHORIZED USER IN CARRYING OUT MANAGEMENT DEMANDS. —98

FIG. 10C

```
┌─────────────────────────────────────────────────────────┐
│ A "SNAPSHOT" DESIGNATED BUTTON OF THE MBRD OF THE        │
│ SECOND PS CAN BE SELECTED BY ANY AUTHORIZED SYSTEM       │──100
│ USER FOR RECORDING AS REQUIRED ANY GIVEN CS MEANS OF     │
│ THE FIRST PS OR ANY DISPLAYED MENU / SUBMENU OF THE      │
│ THIRD PS.                                                │
└─────────────────────────────────────────────────────────┘
                              ↓
┌─────────────────────────────────────────────────────────┐
│ A FIFTH PS OF THE MSVD OF THE UCIVDWS MEANS THROUHOUT    │
│ SYSTEM USE PROVIDES CONTINUOUS OPERATION FEEDBACK AS     │
│ TO THE CURRENT STATUS OF ANY SERIES OF SYSTEM            │──102
│ OPERATIONS RELATIVE TO ANY SELECTED FB MEANS OF ANY      │
│ GIVEN CS MEANS OF THE FIRST PS, ALL FOR THE PURPOSE OF   │
│ ASSISTING ANY AUTHORIZED USER IN SELECTIVELY MONITORING  │
│ AND CONTROLLING THE SYSTEM IN ACCORDANCE WITH            │
│ MANAGEMENT DEMANDS.                                      │
└─────────────────────────────────────────────────────────┘
                              ↓
┌─────────────────────────────────────────────────────────┐
│ WHEN ANY USER SELECTS THE "SHUTDOWN" DESIGNATED          │
│ BUTTON OF THE MBRD OF THE SECOND PS IT CAUSES IMMEDIATE  │
│ STOPPING OF THE SYSTEM FOR SELECTIVLY MONITORING AND     │──104
│ CONTROLLING PROCESSES OF ANY CS MEANS OF THE FIRST PS    │
│ UNTIL AN AUTHORIZED USER RESTARTS AND ACCESSES THE       │
│ SYSTEM FOR ANOTHER CYCLE AS SET FORTH ABOVE.             │
└─────────────────────────────────────────────────────────┘
```

FIG. 10D

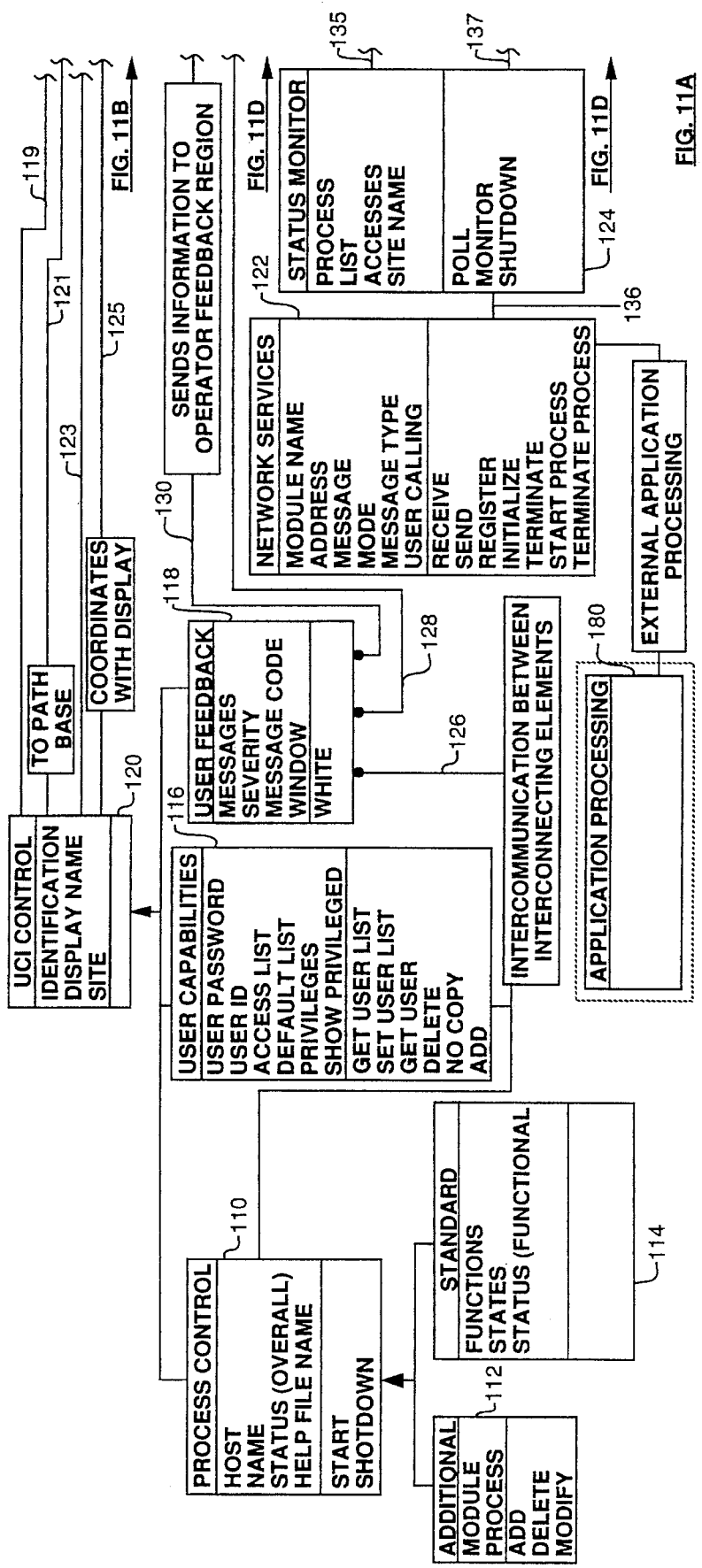

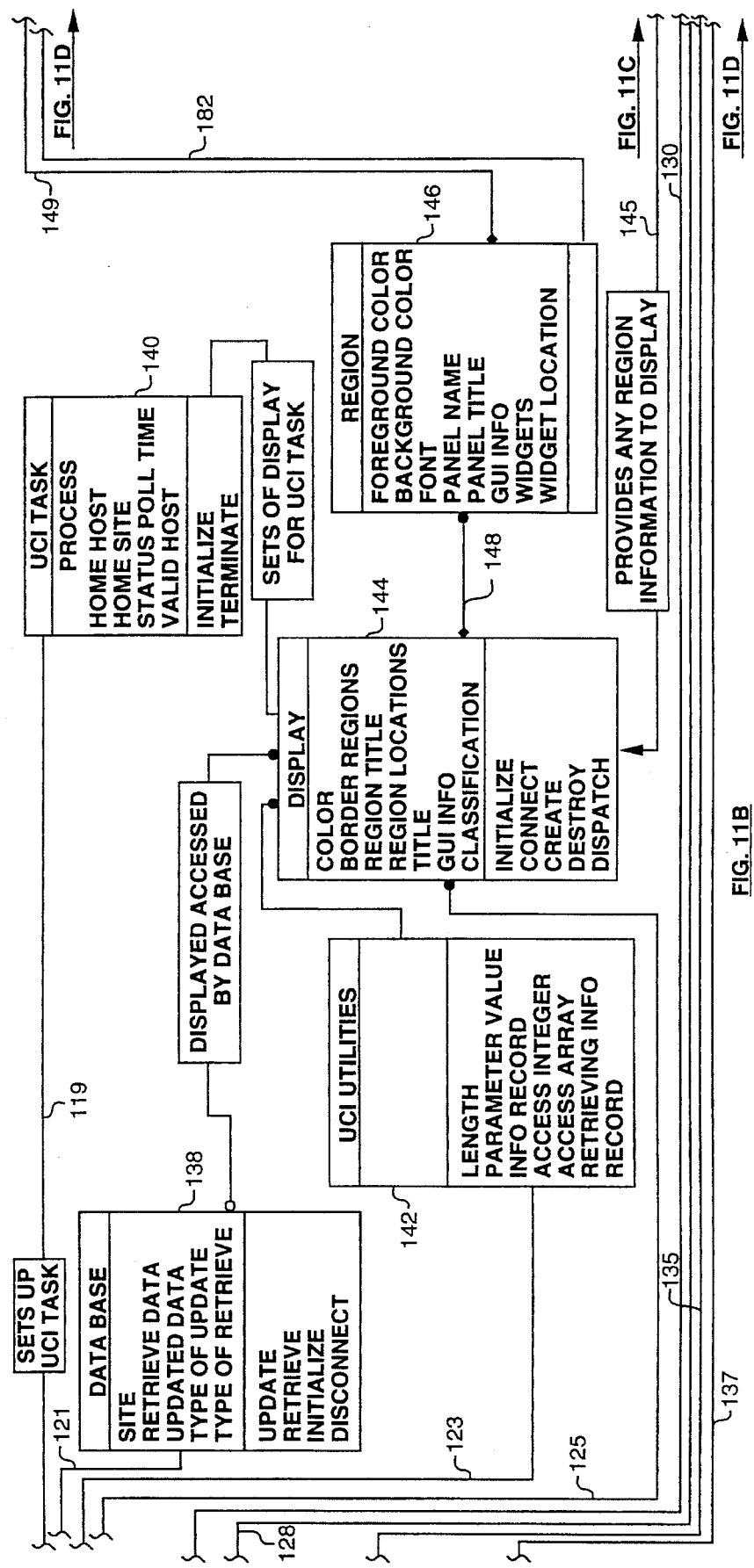

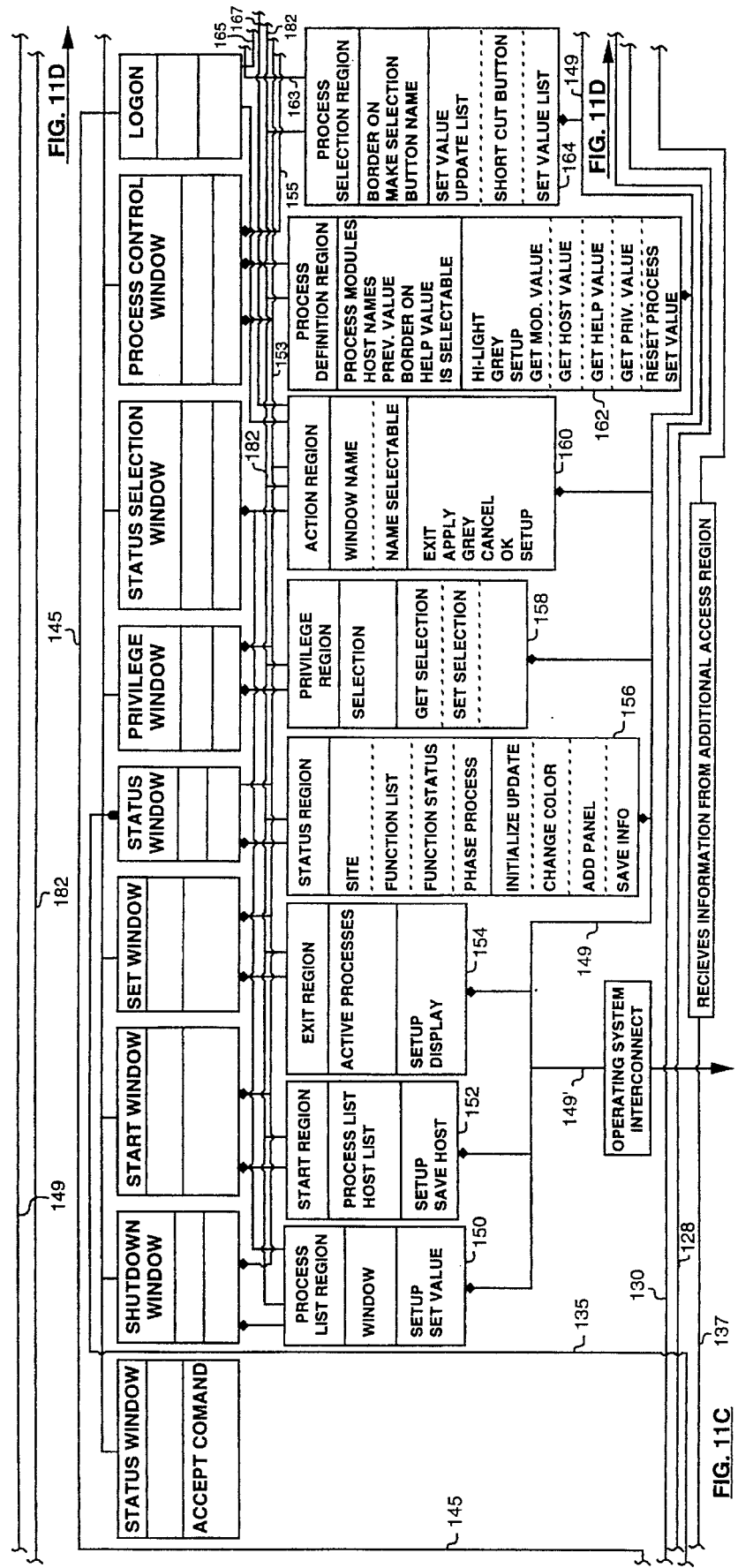

SYSTEM AND METHOD FOR MONITORING AND CONTROLLING ONE OR MORE COMPUTER SITES

This invention concerns an improved user computer interface visual display workstation system for selectively monitoring and controlling at least one computer site means for the purpose of carrying out various mission requirements in response to management demands and an improved method for carrying out the system; and, more particularly, it concerns an improved user computer interface visual display workstation system having a predetermined acceptable password for any user, and also having a multi-formatted, multi-section visual display for displaying a plurality of user-selectable function button means for at least one computer site means such that when any computer site means with its function button means being displayed can be selectively monitored and controlled by any password acceptable user whether any computer site means is arranged local to or remote from the common user computer interface visual display workstation means of the system and also for enabling any password acceptable user to select various function button means of certain sections of the display, such that once any function button means of the plurality of function button means of any displayed computer site means has been user selected as well as any user to also select from a variety of menus either for selectively monitoring any computer site means or user selection relative to any displayed option-driven menu (or submenu) all of which contribute to a password acceptable user in response to management demands to selectively monitor and control at least one computer site means throughout system use; and an improved method involving unique steps for selecting various system functions from the display at the common workstation means relative to any computer site means as well as for selecting various menus therefrom all for selectively monitoring and controlling any computer site means.

BACKGROUND OF THE INVENTION

Various computer techniques have been designed in the past for enhancing computer operations. For example, U.S. Pat. No. 5,123,089 to M. S. Belinski et al discloses a local area network multiple computer system having a plurality of network controllers for controlling user access. U.S. Pat. No. 5,126,932 to C. D. Wolfson et al relates to to a multiple heterogenous computer system having a control and coupling arrangement for effecting execution of any program between heterogenous computers of the system. U.S. Pat. No. 5,142,6873 to K. J. Burkhardt, Jr. et al relates to a multiple computer system having a common motherboard and addressable mailboxes for each system computer. U.S. Pat. No. 5,142,622 to G. L. Owens discloses multiple computer networks that have different network domains but with each computer network being interconnected by a mapping protocol for proper connection and communication between the network domains. However, none of the aforediscussed references whether taken alone or in any combination remotely suggest an improved user computer interface visual display workstation system and an improved method having unique selecting steps for carrying out the system. The system has a user password acceptable access at any predetermined level and also has a multi-formatted, multi-section visual display at the common user computer interface visual display workstation means of the system with certain display sections having a plurality of user selectable function button means and a variety of displayed menus some of which are option-driven with the menus being displayed in response to user selection of certain function button means of the display; all for selectively monitoring and controlling at least one computer site means whether any computer site means is arranged locally to or remote from the system common user workstation means and whether any computer site meanshave either the same or different operating systems relative to any other system computer site means or the system common workstation means itself.

SUMMARY OF THE INVENTION

An improved user computer interface visual display workstation system where the system common workstation means enables any password acceptable user at any predetermined access level to selectively monitor and control at least one computer site means for the purpose of carrying out multi-mission requirements in response to management demands even when a plurality of computer site means are operatively associated with the system common user workstation means.

Another object of the invention is to provide an improved user computer interface visual display workstation system with system common user workstation means having a multi-formatted, multisection visual display with the display sections providing a plurality of user-selection functionbuttons and a variety of menus and submenus being displayed in response to user selection of at least one function button all for enabling any password acceptable user in response to management demands to selectively monitor and control at least one system computer site means.

Still another object of the invention is to provide an improved method having unique selecting steps as effected by a user for carrying out selective monitoring and control of local and/or remote computer site means from common user computer interface visual display workstation means of a systematized arrangement even when system computer site means have different network domains relative to each other and the common workstation means; and with the improved steps being advantageously effected by an improved open ended software architecture design for interconnecting and operatively associating the system common user workstation means to any computer site means.

In summary, the improved user computer interface visual display workstation system has a predetermined password acceptable access level for system security control and also has a multi-formatted, multi-section visual display at the system common user computer interface workstation means. Certain sections of the display have a plurality of user-selectable function-button means as well as also have a variety of menus and submenus in response to user selection of certain function-button means where these function-button means along with the menus and submenus not only selectively monitor and control any computer site means whether the computer site means is local to or remote from the system common workstation means but also permit password modification for any subsequent user as effected by any current acceptable user at the system common workstation means all for enabling continuous and tailored management control of any computer site means in carrying out management demands.

The improved system is advantageously provided with an open ended sofware architecture design that permits easy changes to the system as required while at the same time the software design assures interconnection between any computer site means and the common workstation means even though any computer site means has a different operating system or network domain relative to any other computer site means or the common workstation means itself.. The improved method in carrying out the system provides unique selecting steps as effected by a user at the common workstation means for selectively monitoring and controlling any computer site means.

In view of the foregoing, other objects and advantages of the invention will become more apparent when taken in conjunction with the appended specification, claims and drawings as hereinafter described.

BRIEF DESCRIPTION OF THE DRAWINGS

FIGS. 5–6 are two diagrammatic views of two different user selected menus as displayed in another section of the multi-section visual display of the system with either menu being selected for display in the other section as the result of a system user selecting one of the buttons of the plurality of function buttons of the multiple function ribbon or menu selection bar as displayed in still another section of the display; and these views illustrate further details of the invention.

FIGS. 7–9 are a series of three diagrammatic views with each view being for a particular submenu as the result of any system user selecting one of the series of three listed privileged functions as depicted in the FIG. 6 menu.

FIGS. 9A is another diagrammatic view of another submenu display as the result of any system user selecting the button designated "list" in the FIG. 9 submenu.

FIGS. 10A–10D are a series of four views in block format; and they illustrate in flow chart fashion an operative embodiment of the invention.

FIGS. 11A–11D are a series of four schematic views; and these views when taken together illustrate a functionally interrelated block format of a novel software architecture design of the invention.

DETAILED DESCRIPTION

Figure 1:
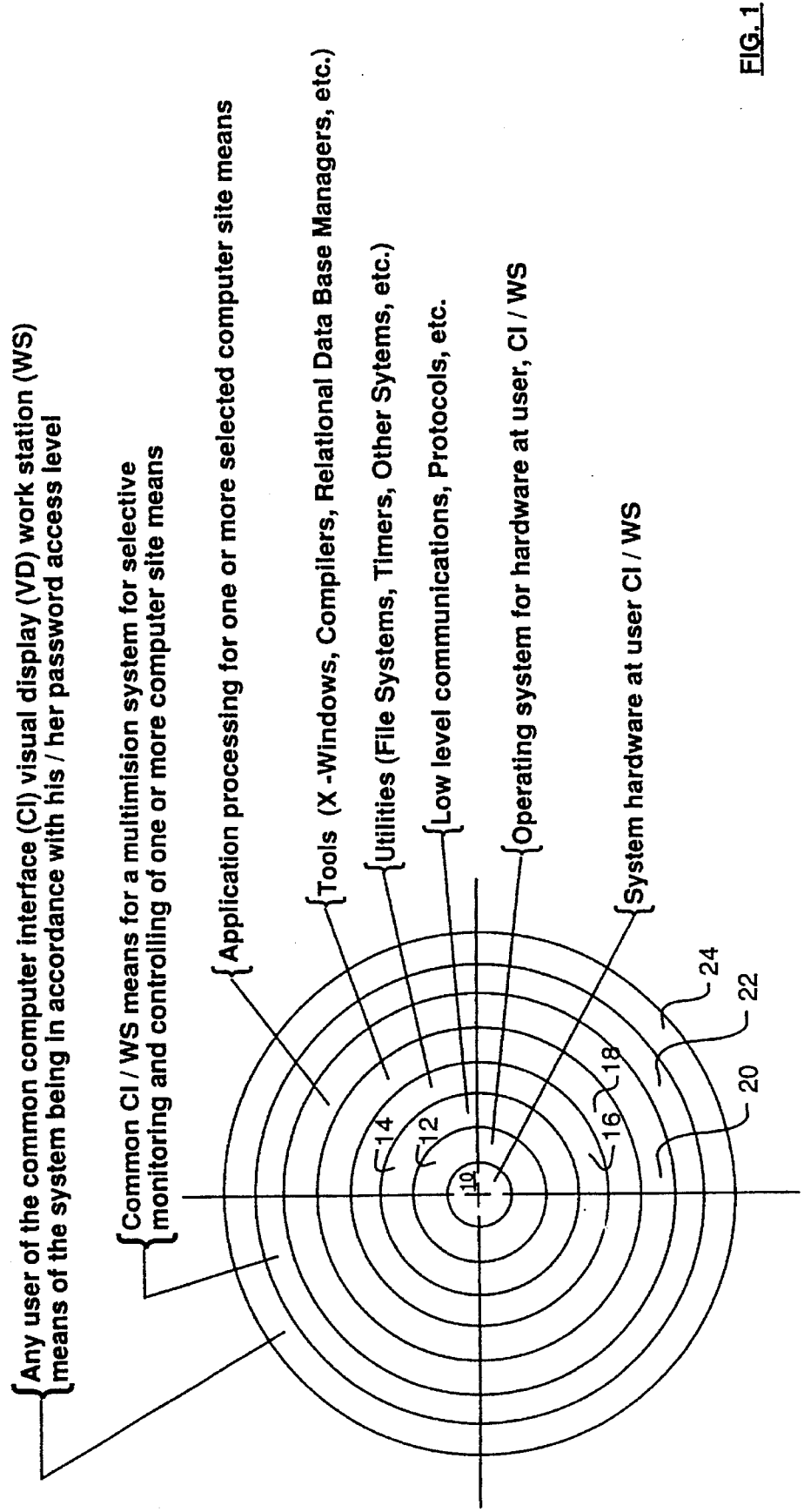
FIG. 1 is a schematic view of a series of concentric rings about a core; and this view illustrates from the core to the outermost ring the series of progressive and various computer system improvements relative to computer system hardware; and it further illustrates in the two outermost rings of the series an improved embodiment of the invention.
Figure 2:
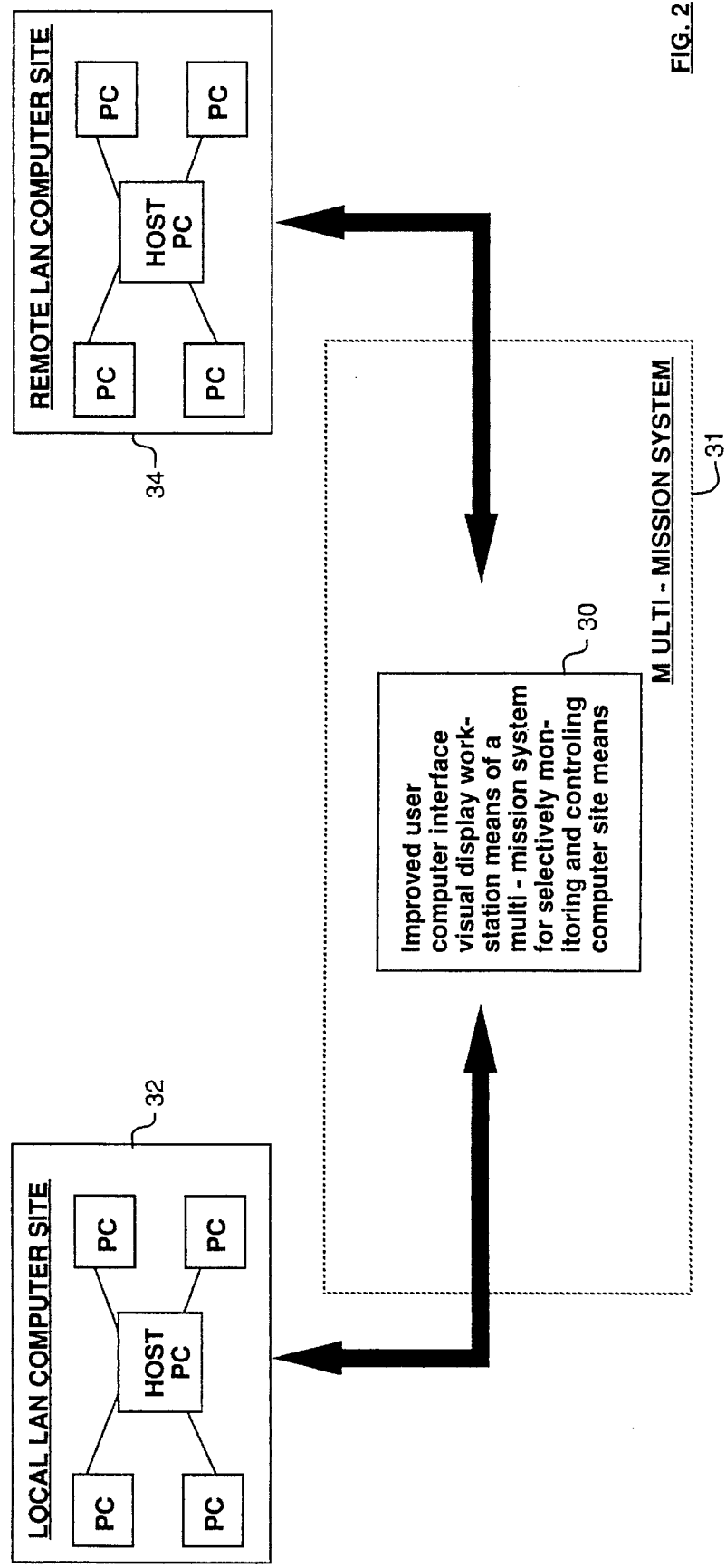
FIG. 2 is a schematic view and it illustrates in dotted and solid lines an embodiment of the improved system in operative relation to both local and remote computer site means.

With further reference to the drawings, a series of seven concentric rings are arranged about a core as generally illustrated in FIG. 1; and it generally illustrates the progressive development of the computer art from computer hardware at core 10, to operating systems for the hardware at first or innermost ring 12 of the series, low level communications, etc. at second inner ring 14 thereof, utilities (file systems, timers, etc.) at third inner ring 16, tools at fourth inner ring 18, application processing for computer site means at fifth inner ring 20, a user common computer interface visual display workstation multi-mission system for computer site means as an embodiment of the invention at a sixth inner ring 22, and any authorized user of the system (sixth ring) at an outermost ring 24. By reason of the illustration in FIG. 1, one can readily see the progressive development from basic computer hardware to various application and support systems for the hardware until the improved system and method of the instant invention as will be further described below. As depicted in FIG. 2, an improved system 31 having user common computer interface visual display workstation means 30 can be operatively associated with and interconnected to various computer site means, such as the computer site means 32 and 34 that are arranged locally and remote from the system. As illustrated, the computer site means are local area networks, each with its own host computer. But it is to be understood that the computer site means could be either of corresponding configuration other than shown (such as without a host computer) or of different configurations from that shown in FIG. 2.

Figure 3:
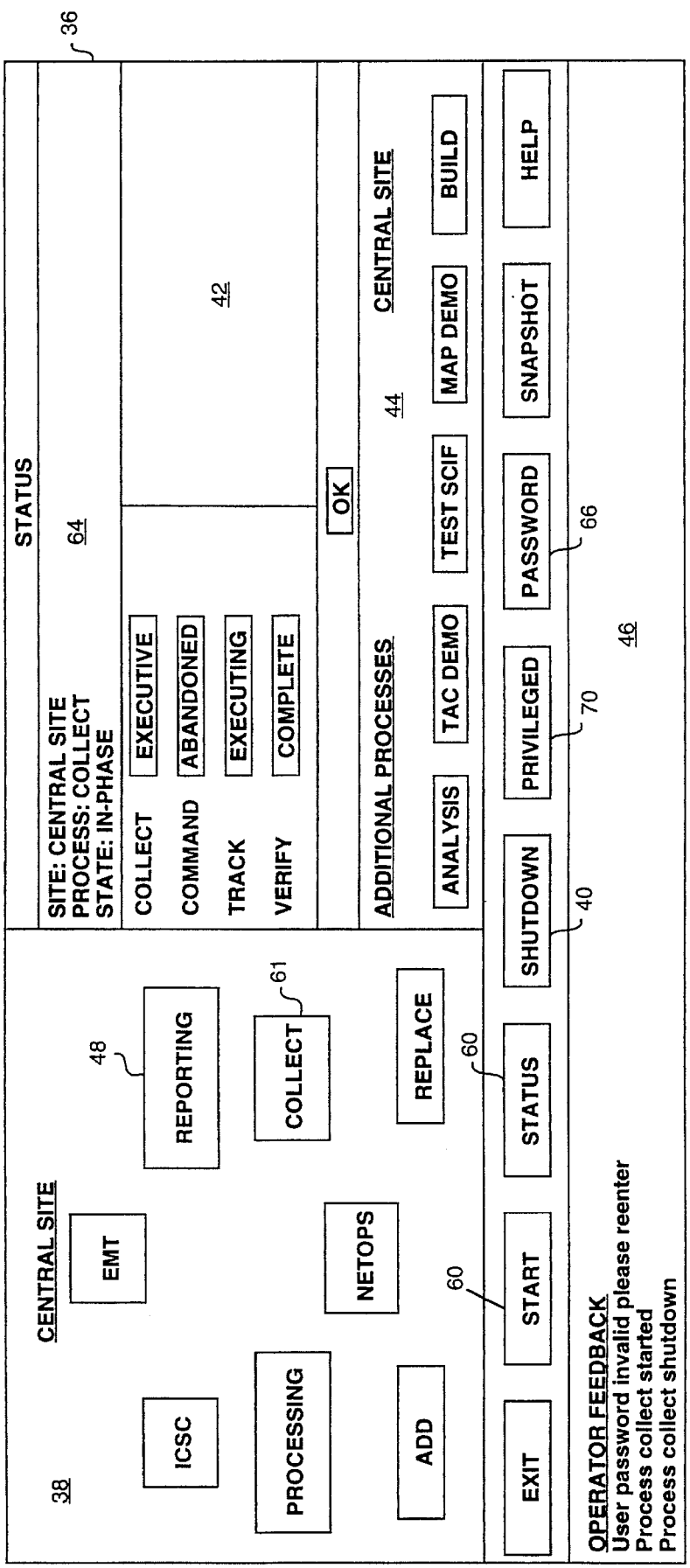
FIG. 3 is another diagrammatic view of a representative multi-formatted, multi-section visual display of the system common workstation means; and it illustrates more than one operative embodiment thereof.

As illustrated in FIG. 3, a multi-formatted, multisection visual display 36 of the workstation means is generally made up of computer site means section 38, ribbon or menu selection bar section 40, menu display or work region section 42, additional processes section 44 and operator feedback section 46. First predetermined section 38 of the display relates to one computer site means designated "CENTRAL SITE" that can be arranged either local to or remote from the system common user workstation means. Central site computer site means 38 is made up of a plurality of user-selectable function-button means that are arranged in rowwise and columnwise relativly spaced relationship to each other. Each function-button means is designated for a particular process such as "REPORTING", "COLLECT", etc. as shown. The lowermost pair of function button means as displayed in section 38 are designated "ADD" and "REPLACE" for adding at least one more computer site means to section 38 from the system data base; and for replacing a computer site means of section 38 as displayed with another computer site means therefrom all during system use.

Ribbon and second predetermined section (pred.sect.) means 40 of display 36 is made up of a plurality of eight relatively spaced user-selectable function button means that are arranged in single row-like and relatively spaced relation to each other; with each function button means of the plurality being differently designated such as "EXIT", "START", etc. Third pred. sect. or work region means 42 depicts various menus and submenus with or without user option selections for selectively monitoring and controlling any computer site means. Any menu is displayed in the third pred. sect. as the result of any user selecting a function button means from the second pred. sect., such as, e.g., the "STATUS" designated function button means as shown. Other menus displayed in the third pred. sect. as effected by user selection of function button means in section means 40 as well as the "STATUS" menu as presently shown in FIG. 4 will be further discussed hereinafter.

Fourth pred. section means 44 concerns a plurality of five user-selection function-button means that are also arranged in single row-like fashion and relatively spaced relation to each other for effecting additional processes of any user selected function-button means of any computer site means of the first pred. sect. means being currently monitored and controlled during system use. Fifth pred.sect. means 46 of the visual display at the workstation means pertains to operator feedback information relative to a user currently selected function button means of any computer site means displayed in section 38 or any menu displayed in section 42. This fifth section always lists a series of current situations, such as, e.g., indicated in FIG. 3, that are of beneficial interest to any user in operating the system workstation means.

Figure 4:
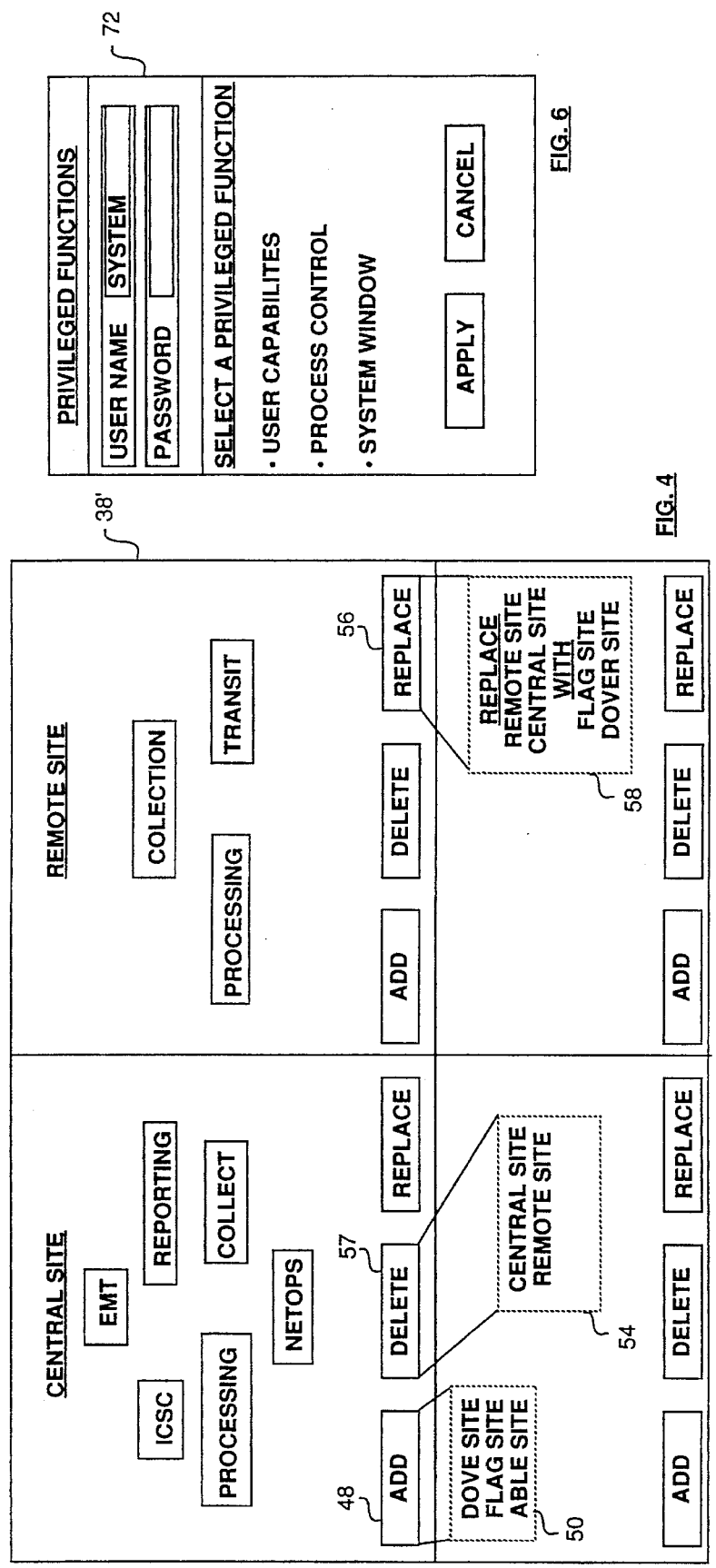
FIG. 4 is another diagrammatic view in dotted and solid lines of one of the sections of the multi-section visual display; and it illustrates on an enlarged scale both another configuration of the visual display as well as more than one slight modification (in dotted lines) of the other configuration.
Figure 10A:
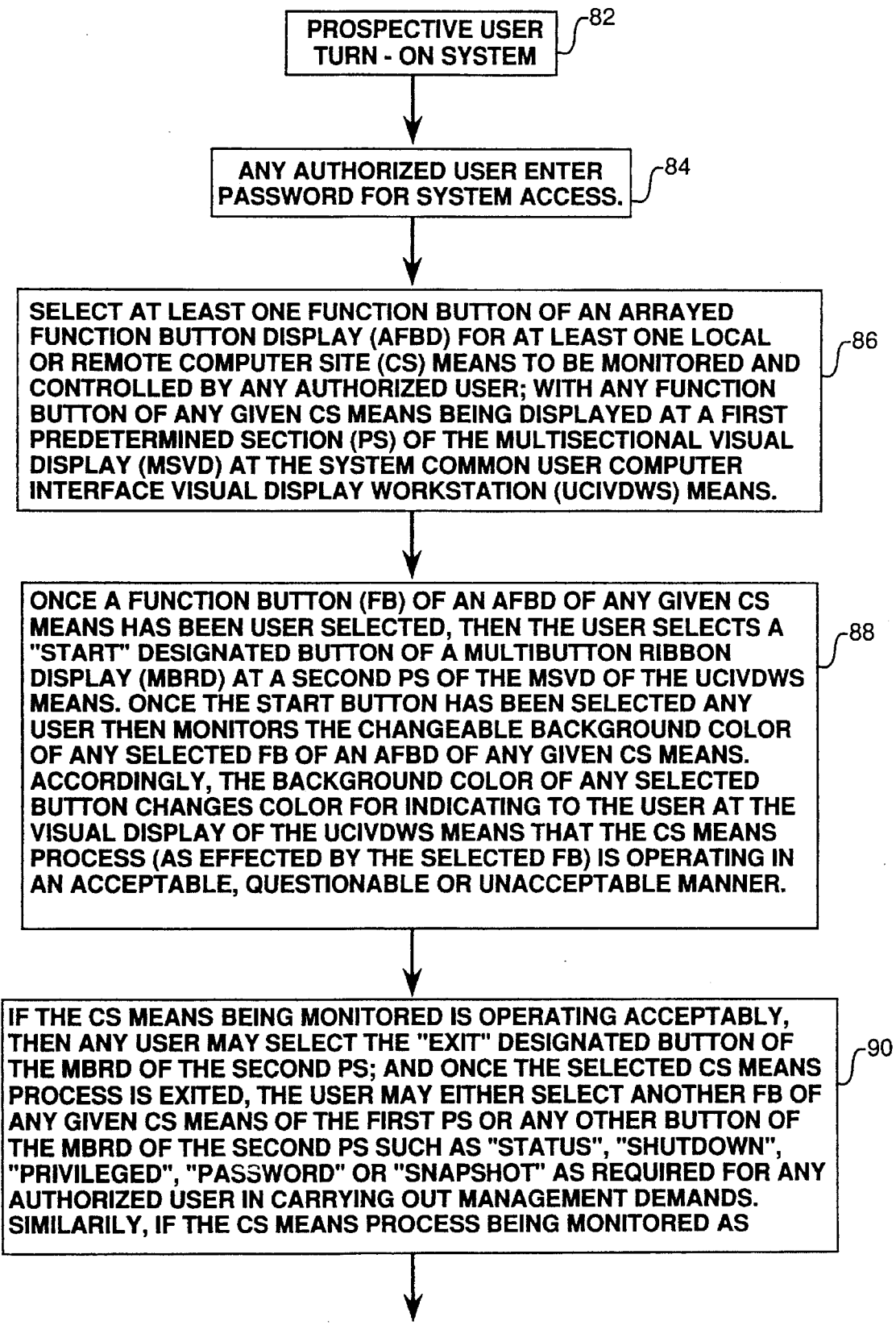
Figure 10B:
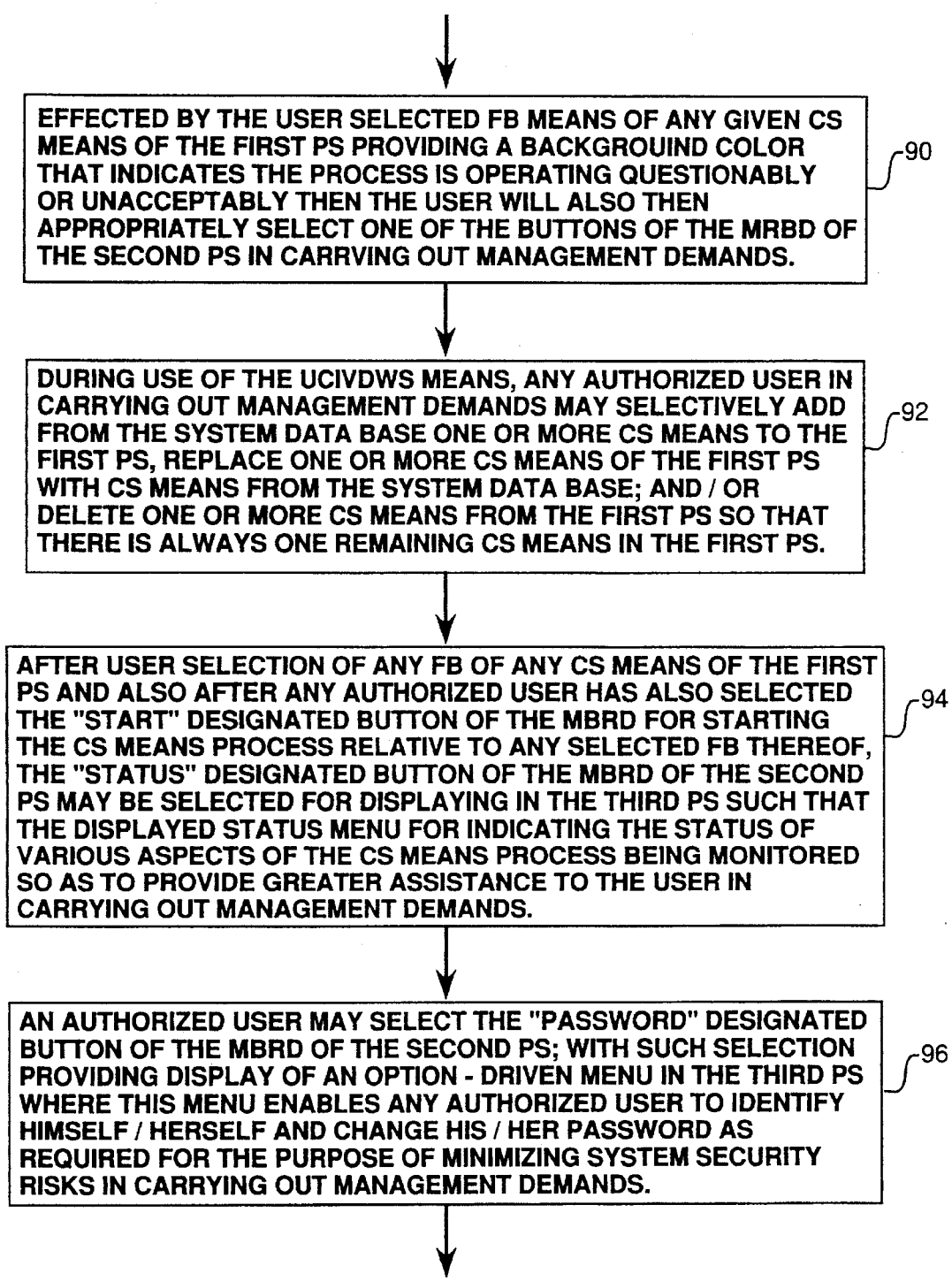

As further illustrated in FIG. 4, first pred.sect. 38' of multi-section visual display (MSVD) 36 can be reconfigured as desired by any authorized user. Though first pred. sect. 38' is configured for a plurality of four computer site means, it could be configured for a plurality of eight computer sites (not shown) if desired or configured for one computer site as illustrated in FIG. 3. To this end any authorized user can select function-button 48 designated "ADD" (FIG. 4) and an option-driven menu 50 will be displayed below "ADD" button 48. This menu specifies a series of computer site means from the data base of the workstation means 30. Similarly, when any authorized user desires to delete a computer site means from section 38', then he or she would select "DELETE" designated button 57 for displaying option-driven menu 54 where either one of the computer site means listed could be selected for deletion from section 38' as currently displayed. The system workstation means as presently programmed will always display one designated computer site means (FIG. 3), unless any authorized workstation user selects another multiple computer site means configuration (such as shown in FIG. 4) for carrying out the improved multi-mission system of the invention. Further, as depicted in FIG. 4, any authorized user can select "REPLACE" designated button 56 and an option-driven menu 58 will provide a series of replacement computer site means for user selection relative to the computer site means currently displayed. It should be evident that any authorized user has the option to select any of the "ADD", "DELETE" OR "REPLACE" designated buttons in FIG. 4 for carrying out any changes relative to any computer site means displayed or to be displayed. It is noted here when there is only one computer site means displayed for section 38 in FIG. 3, then only "ADD" or "REPLACE" buttons are required as one computer site means is always displayed in the first pred. sect. throughout system use.

Once the system workstation means is turned on and once any authorized user selects a function button means of any computer site means displayed in section 38 or 38', then the "START" designated button 60 of the plurality of eight function button means of the second pred. section can be user selected. Assuming that any authorized user has selected "COLLECT" designated button 61 of displayed CENTRAL SITE computer site means of section 38, then processes relative to the selected "COLLECT" function at the central computer site means begins. It is noted here when a computer site function button has been selected by any authorized user then the button changes background color from a lighter gray color to a darker gray color. Moreover, with the "START" and "COLLECT" buttons both being user selected, then the "COLLECT" button changes from a darker gray color to a red, green or yellow color so as to further indicate that the function designated and user selected "COLLECT" button either is not carrying out its processes properly, correctly or questionably. To further check the status of the user selected function button means "COLLECT", a "STATUS" button 62 in second section 40 of display 36 can be user selected for displaying a "STATUS" menu 64 in third section 42 thereof. This "STATUS" menu provides various aspects of the "COLLECT" function process as being complete, executing or abandoned so as to further define what's being done by the improved system in carrying out monitoring and control of one or more processes of any computer site means as displayed in section 38 or 38' regardless of the color indicated by the user selected function button of any selected computer site means as displayed in section 38 or 38'. In other words if the color indicated by any user selected function button of any computer site means (with or without the assistance of any authorized user selecting "STATUS" function button means for the STATUS menu display in section 42) is not acceptable, then the user can report same to management so that appropriate steps can be taken.

Once a user password is accepted by the system workstation it can be changed by any authorized user selecting function button 66 designated "PASSWORD" in second section 40. In response to this selection a PASSWORD menu 68 as depicted in FIG. 5 is now displayed in third section 42 having obvious fill-in areas for changing the user's password for continued or future access as required for the purpose of minimizing management security risks during system use.

In response to any authorized user's selection of function button 70 designated "PRIVILEGED" in second section 40 (FIG. 3), a menu 72 designated privileged functions is displayed in third section 42 as illustrated in FIG. 6. Once the user password is entered in menu 72, then anyone of the privileged functions specified by the menu can be user selected during system use. Assuming that "Process Control" has been selected, then submenu 74 designated "PROCESS CONTROL" will now appear in section 42 as depicted in FIG. 7. This submenu controls designation of the plurality of five buttons that are arranged in single row-like fashion and relatively spaced relation to each other as depicted in fourth pred. sect. 44 of workstation display 36. Also, for any selected function button of any computer site means as displayed in section 38 or 38' of display 36, the computer site means will also appear in fourth section 44 such as the designated "CENTRAL SITE" in response to the user selection of a function button means of the displayed computer site means of section 38. From the process name list in submenu 74 process names can be added, modified or deleted as required. Of course, the additional process designated button for each one of the function buttons of display section 44 has been selected by submenu 74; but it is to be understood that it could be changed by the authorized user selecting from the list as desired. If so, then function button designated "BUILD" in section 44 would change to another designation depending upon the user selection made from the process list of submenu 74. Also, for the selected function button designated "BUILD" in submenu 74, a HOST NAME for the host computer of a selected computer site means of section 38 or 38' of display 36 can be selected. Further, process privileges of sub menu 74 can be extended to all authorized users or just any current authorized user thereby maintaining system control in response to management demands.

In similar fashion as shown in FIG. 8, an authorized user once having exited submenu 76 from submenu 74 can select "SYSTEM WINDOW" from the list of submenus as displayed in menu 72 in third secton 42. When "SYSTEM WINDOW" submenu display is shown in section 42 then any authorized user can type-in any desired keyboard entries (not shown) for the purpose of changing the data base of the system workstation means in response to management requirements for selectively monitoring and controlling of any computer site means as displayed in section 38 or 38' of the common user workstation display. Once SYSTEM WINDOW submenu entries have been made or deleted by any authorized user, then this submenu 76 is exited from section 42.

A user can also select "USER CAPABILITIES" submenu 78 as listed in submenu 72. Then USER CAPABILITIES designated submenu 78 now appears in section 42 as illustrated in FIG. 9. Any authorized user by selecting "ADD", "MODIFY" or "DELETE" designated buttons of submenu 78 along with "APPLY" designated button thereof can make appropriate addition, modification or deletion to the non authorized (non selected) user list of submenu 78. Once appropriate changes, if any, have been made to the nonuser list, then a selected nonuser I.D. and password can be entered in submenu 78 so that a selected nonuser in submenu 78 has no user capability even though the selected nonuser still has an acceptable password to part of the system data base. Hence, a selected nonuser by this nonuser selection in menu 78 would be precluded from any changes to his password even if the password button 66 of second pred. .section 40 were selected by the now designated system nonuser.

Lower tier submenu 80 is depicted in FIG. 9A, when any authorized user selects the "LIST" designated button of submenu 78 (FIG. 9). Then, any authorized user (by merely adding or deleting the "X" to or from any process as listed in submenu 80) can control system authorized access in carrying out management demands for selectively monitoring and controlling any selected computer site means of section 38 or 38' during system use. Moreover, authorized user access to any list of submenu 80, such as for adding or deleting an "X" designation relative to any listed process is controlled by the the user selection bar 81 of submenu 78 (FIG. 9).

It is noted here that whenever a function button is selected by an authorized user in either display section 40 or 44, that the button changes color, such as, e.g., from a light gray to a dark gray for the purpose of indicating that a button has been user selected during system use. Moreover, any function button of the display as well as any selection button of a menu or submenu as displayed can be actuated in any fashion, such as by a touch screen technique, a mouse technique, a keyboard function command button, etc.

To further illustrate an operative embodiment of the improved system, reference is made to the flow chart of FIGS. 10A–10D. As depicted by blocks 82 and 84 in FIG. 10A, the system is turned on and any authorized user once his/her password is accepted, then accesses same. Then the accepted user may selectively monitor and control any selected function button of any given computer site means of the first pred. sect. 38 or 38' of the multi-section visual display of the system common user computer interface visual display workstation means as exemplified by block 86. Then a selected function button, START button 60 of second predetermined section 40 is user selected for activating processes of the selected function button of any given computer site means. With this activation, the selected function button will change from its user selection indicating background dark gray color to anyone of three background colors of green, red or yellow for acceptable, unacceptable or questionable processes being carried out by a user selected function button means of any given computer site means being monitored, etc. Regardless of the background color indicated by the selected function button means, any accepted user may select the EXIT designated button of second pred. sect. 40 at any time, as indicated by block 90. Then with user's discretion another or same function button of any displayed computer site means may be selected.

If only one computer site means is depicted in the first pred. sect., then it can be selectively changed to any other computer site means within the system workstation means data base. If one or more computer site means are displayed in the first pred. sect. then the user at his/her discretion can ADD, DELETE or REPLACE (block 92). With any function button of any computer site means being activated, then its status apart from changes in background color can be further analized (defined) by any user also activating STATUS button 62 of second pred. section 40. This activated button then provides menu 64 as displayed in third pred. sect. 42 of the visual display (block 94).

At any time when any authorized user accesses the system, the user can change his/her password by activating the PASSWORD designated button 66 of second pred. sect. 40 so that a password menu is provided in the third pred. sect. (block 96). After any selected function button means of any selected computer site means is activated the user may activate PRIVILEGED function button 70 of second pred. sect. for displaying option-selection privileged functions menu 72 in the third pred. sect. Then the user can select any one of the submenus from menu 72 where each one of the selected submenus will appear for user editing as required in the third pred. sect.; all in response to authorized user demands (block 98, FIG. 10C).

At any time after any authorized user has accessed the system regardless if a computer site means has been selected, started, etc.; a recording SNAPSHOT button of the second pred. sect. is selected so that first pred. sect. as configured may be recorded or any menu (submenu) as displayed in the third pred. sect. (block 100, FIG. 10D) may also be recorded. Operator feedback is continuously provided by the work-station visual display (block 102) and the system once accessed may be shutdown at anytime (block 104).

Reference is now made to an open software architecture design, that utilizes improved software design standards as developed by James Rumbaugh at the General Electric Research and Development Center, Schenectady, N.Y. These standards are set forth by James Rumbaugh et al in a book entitled "Object-Oriented Modeling and Design" as published by Prentice-Hall of New Jersey where the book sets forth functionally interconnected blocks and various symbols; all of which contribute to simplification of any software design while at the same time these blocks and symbols permit quick changes, expansion or contraction as required. Accordingly, the improved sofware design of the instant invention incorporates these Rumbaugh standards as will now be set forth.

Figure 11D:
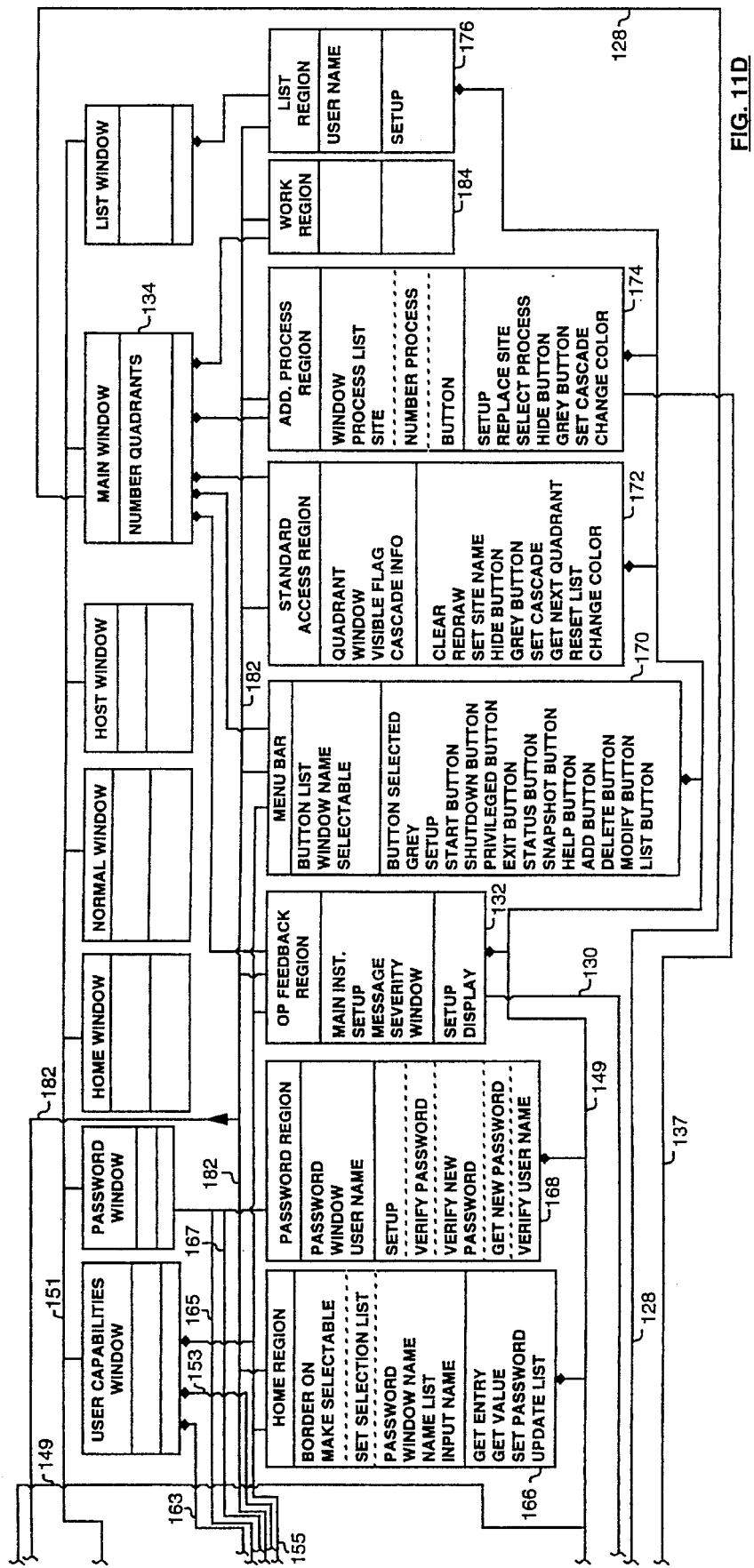

With reference to FIG. 11A, it is evident that all blocks 110–124 have a particular designation which relates to a feature of the invention. Also, a first or intermediate section of each block specifies, if any, one or more attributes; similarly a second or bottom section of any block specifies one or more, if any, operational functions. An arrow symbol interconnects blocks 112 and 114 to block 110 via a parallel interconnecting line; and blocks 110, 116 and 118 to block 120 via another parallel interconnecting line. Thus, because of the arrow symbol being part of the line between blocks 112, 114 and 110; blocks 112 and 114 attributes and functions, if any, are common with block 110. Hence, these attributes and functions of blocks 112 and 114 need only be specified therein. Similarly with the other parallel line having an arrow symbol therein, blocks 110, 116 and 118 have attributes and functions that are common with block 120. Line 126 parallel interconnects blocks 110 and 116 to block 118. Lines 128 and 130 interconnect block 118 to blocks 132 and 134 (FIG. 11D). Also, lines 126, 128 and 130 at their separate points of junction with block 118 are provided with a filled-in circle symbol. These circle symbols indicate zero or more connections between the interconnected blocks thereof. Where there is no symbol provided for a line interconnecting blocks, such as line 136 for blocks 122 and 124 then there is only one instance of connection between these blocks.

Reference is made to FIG. 11B and the series of five designated blocks 138, 140, 142, 144 and 146 depicted therein. A line 148 interconnects blocks 144 and 146. Also, a diamond symbol is provided at the junction point of interconnecting line 148 with block 144. This diamond symbol means that the attributes of block 146 are an aggregate of the attributes of block 144. Since block 146 does not specify any operational functions they are not an aggregate of the operational functions of block 144. The filled-in circle symbol at the junction of line 148 with block 146 indicates that the aggregation of attributes of block 146 can be interconnected in more than one instance to block 144.

Reference is now made to the series of eight blocks 150, 152, 154, 156, 158, 162 and 164 of FIG. 11C; and the series of seven blocks 166, 168, 132, 170, 172, 174 and 176 of FIG. 11D; all of which have aggregate components both as to attributes and operational functions that are interconnected to block 146 (FIG. 11B) via parallel interconnecting line 149 (FIGS. 11C–11D). It is noted here that the commercially available operating system software of the invention workstation means, such as, e.g., "UNIX", is interconnected via branch line 149' of line 149 to the improved application system software design of the workstation means as embodied in FIGS. 11A–11D. Suffice it to say, that any acceptable user in utilizing block 120 together with blocks 110, 112, 114, 116, 118, 138, 140, 142 and 144 as depicted in FIGS. 11A–11B is able to selectively control the series of region blocks 146, 150, 152, 154, 156, 158, 160, 162, 164, 166, 168, 132, 170, 172, 172, 174, 184 and 176 as depicted in FIGS. 11B–11D; and thus, in turn selectively control the activated function button means of any selected displayed computer site means as effected via blocks 122, 124 and 180 of FIG. 11A. It is also noted here that block 146 and interconnecting line 182 with an arrow symbol provided therein as shown in FIG. 11D, that the attributes and functions, if any, of blocks 150, 152, 154, 156, 158, 160, 162 and 164 as depicted in FIG. 11C; and blocks 166, 132, 170, 172, 174, 184 and 176 as depicted in FIG. 11D are all subclasses associated with the attributes and functions respectively of block 146 (FIG. 11B). It should now be evident that the improved design of FIGS. 11A–11D is advantageously useful in carrying out in simplified and standardized fashion various novel aspects of the improved system and method of the invention.

Obviously many modifications and variations of the present invention are possible in light of the above teachings. It is therefore to be understood that, within the scope of the appended claims, the invention may be practiced otherwise than as specifically described.

What is claimed is:

1. Improved multimission monotoring system for selectively monitioring at least one computer site means for the purpose of assuring that the one computer site means is fulfilling its mission as to any monitored function thereof, the system comprising:

user computer interface workstation means having display monitor means and data base means, the display monitor means for simultaneously displaying a plurality of at least three predetermined section visual display means, first predetermined section visual display means of the plurality always having at least one computer site means displayed therein, the one computer site means in being displayed having a plurality of relatively spaced user selection function button means arranged in both multi-rowwise and multi-colunmwise fashion relative to each other so as to provide an arrayed pattern of function button means of the plurality thereof where each function button means of the plurality of the one computer site means is for a particular designated function of the one computer site means that is to be monitored for the purpose of seeing if the selected function button means is satisfactorily carrying out its mission when it is selected by an authorized user during system use, the one computer site means being displayed also having another function button means designated replace for selectively replacing the one computer site means being displayed in the first predetermined section visual display means with another computer site means from the data base means when an authorized system user selects the other function button means designated replace during system use, second predetermined section visual display meansof the plurality having a second plurality of relatively spaced function button means arranged in single row-like fashion, one of the function button means of the second plurality being designated start for starting the monitoring of a user selected function button means of the first plurality of the one computer site means when the start designated function button means is selected by a user after the user has selected a function button means of the first plurality, second function button means of the second plurality being designated status for providing a status menu being displayed in the third predetermined section visual display means of the plurality where the status means indicates the condition of various aspects of the function button means of the first plurality that is currently user selected, third function button means of the second plurality being designated password such that when the password designated function button means is user selected it provides a password meanu in the third predetermined section visual display means such that the password menu permits the current user to change his/her password so as to minimize security risks in preventing any unauthorized user from having access to the monitoring system, and fourth function button means of the second plurality being designated privileged such that when the privileged designated function button means is selected by a user of the system it provides a privileged functions menu in the third predetermined section of the visual display means where the privileged functions menu provides a series of at least three selectable privileged function submenus, one of the submenus of the series being designated user capabilities such that upon being selected by a user, the third predetermined section of the visual display means provides a user capabilities submenu for limiting the access level of any user as specified in the user capabilities sub menu to one or more or none of the series of three privileged function submenus and also for limiting the number of functions of any computer site means to be monitored by any user as specified in the user capabilities submenu; whereby the plurality of three predetermined section visual display means of the system not only permit user selectability for monitoring any function means of any computer site means being displayed but also control the password being used by any authorized user as well as the access level of any authorized user to the system.

2. Improved multimission monitoring system as set forth in claim 1, wherein once a function button means of the first plurality of function button means of the one computer site means being displayed is selected, then the selected function button means changes color to indicate its selection to any system user.

3. Improved multimission monitoring system as set forth in claim 2, wherein when the first function button means designated start of the second plurality is selected by any system user after a function button means of the first plurality is selected by any system user then the selected function button means of the first plurality further changes color to indicate to any system user whether any computer site means function being represented and monitored by the selected function button means of the first plurality is operating satisfactorily, acceptably or unacceptably.

4. Improved multimission monitoring system as set forth in claim 1, wherein the first predetermined section visual display means is comprised of a second function button means designated add for adding more than one computer site means to the first predetermined section visual display means, each computer site means as added having a plurality of function button means arranged in an arrayed pattern both rowwise and colunmwise of the first predetermined section visual display means.

5. Improved multimission monitoring system as set forth in claim 1, wherein the display monitoring means is comprised of a plurality of four predetermined section visual display means, the fourth predetermined section visual display means providing a third plurality of function button means, with each function button means of the third plurality being for an additional process for further monitoring any computer site means being displayed by the first predetermined section visual display means; and wherein the fourth predetermined section visual display means is made up of a third plurality of relatively spaced function button means arranged in single row-like fashion.

6. Improved multimission monitoring system as set forth in claim 5, wherein the privileged function button means of the second plurality of function button means when selected by any system user provides a privileged functions menu in the third predetermined section visual display means of the plurality having a series of privileged function submenus with one of the submenus being designated process control such that upon selection of the process control submenu by any system user provides this submenu in the third predetermined section visual display means so that any system user can select a process designation for any of the function button means of the third plurality of function button means.

7. Improved multimission monitoring system as set forth in claim 1, wherein the third function button means of the second plurality that is designated privileged when selected by any system user provides a privileged functions menu in the third predetermined section visual display means of the plurality such that the privileged functions menu includes a series of submenus one of them being designated system window, the system window submenu when selected by a system user for display in the third predetermined section visual display means permitting selective addition and deletion of keyboard entries to the data base means for selectively controlling monitoring of any function button means of any computer site means being displayed in the first predetermined section of the visual display means.

8. Improved multimission monitoring system as set forth in claim 1, wherein the display monitor means is comprised of a plurality of five predetermined section visual display means, the fifth predetermined section visual display means of the plurality being designated operator feedback for always indicating a series of operating conditions for the system and/or status conditions of any function button means of any computer site means being monitored.

9. A method for selectively monitoring at leat one process function of any computer site means as effected by a password acceptable user having an access level that includes the process being monitored with the user being at a user computer interface visual display workstation means of a system, the method comcomprising the steps of:

selecting at leat one process designated function button means of a plurality of function button means of any given computer site means as displayed by first predetermined section visual display means of multisection visual display means of the user computer interface visual display workstation means of the system for enabling monitoring of a selected process designated function button means of the the selected process designated function button means and also having an access level that includes the selected process designated function button means, selecting start designated button means of second predetermined section visual display means of the multisection visual display means of the user computer interface visual display workstation means of the system for starting operation of previously selected process designated function button means of any given computer site means of the first predetermined section visual display means as effected by a user having an acceptable password and an access level that includes the selected process designated function button means, selecting status designated function button means of the second predetermined section visual display means of the multisection visual display means of the user computer interface visual display workstation means for displaying a status menu in the third predetermined section visual display means of the multisection visual display means once the start designated function button means has been selected by any authorized user for observing various aspects of the operation of the previously user selected process designated function button means of any given computer site means of the first predetermined section visual display means, selecting password designated button means of the second predetermined section visual display means of the multisection visual display means for displaying an option-driven menu in the third predetermined section visual display means thereof for enabling a user of the user computer interface visual display workstation means of the system to selectively change his/her password so as to effectively control system authorized use, selecting privileged designated function button means of the second predetermined section visual display means for displaying an option driven privileged functions designated menu in the third predetermined section visual display means of the multisection visual display means that provides user option selections of user capabilities, process control and system window; and selecting the option selection of user capabilities of the selected privileged functions designated menu so as now to display in the third predetermined section visual display memos of the multisection visual display means a nonuser list of the user computer interface visual display workstation means for selectively preventing any listed nonuser access to all or any menus of the third predetermined section visual display means as well as to all or less than all process functions of any computer site means being displayed in the first predetermined section of the visual display means, whereby the user computer interface visual display workstation means permits authorized user monitoring of any selected process designated function button means of one or more computer site means being displayed by the first predetermined section visual display means while at the same time it controls the access level of any authorized user in accordance with management requirements for user monitoring of any selected process designated function button means.

10. A method as set fort in claim 9, wherein it includes the step of selecting the option selection of process control of the privileged functions designated menu so as now to display an option-driven sub-menu of process control for adding, modifying or deleting a process name from a list of process names as additional process designated functions of any given computer site means of the first predetermined section visual display means; where a series of additional user selectable process designated function button means for effecting additional processes of any given computer site means of the first predetermined section visual display means is displayed in the fourth predetermined section visual display means of the multisection visual display means; and where the process control sub-menu for any listed additional process function has additional option selections of specifying privileged access for either the current authorized user of the system or any potential authorized user thereof as well as of selecting the host name of the given computer site means of the first predetermined section visual display means.

11. A method as set forth in claim 9, wherein it includes the step of selecting the option selection of system window of the selected privileged functions designated menu so as now to display a system window designated sub-menu in the third predetermined section visual display means of the multisection visual display means for enabling any authorized user to selectively enter or delete any keyboard entry onto or from the submenu for the purpose of further selectively controlling the monitoring of any computer site means in accordance with management requirements.

* * * * *